(12) United States Patent
Nakajo

(10) Patent No.: US 6,643,239 B2
(45) Date of Patent: Nov. 4, 2003

(54) OPTICAL DISK RECORDING TECHNIQUE CAPABLE OF FORMING PITS ACCURATELY CENTERED ON TRACK AND SERVO-BALANCE ADJUSTING TECHNIQUE FOR OPTICAL DISK RECORDING

(75) Inventor: Yukihisa Nakajo, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 0 days.

(21) Appl. No.: 09/815,415

(22) Filed: Mar. 22, 2001

(65) Prior Publication Data

US 2001/0010667 A1 Aug. 2, 2001

Related U.S. Application Data

(62) Division of application No. 09/249,660, filed on Feb. 12, 1999.

(30) Foreign Application Priority Data

Feb. 13, 1998 (JP) .............................................. 10-48756
Jun. 30, 1998 (JP) ............................................ 10-199688

(51) Int. Cl.[7] ................................................ G11B 7/00
(52) U.S. Cl. ................................ 369/53.26; 369/44.13; 369/53.31
(58) Field of Search ........................... 369/44.13, 44.35, 369/44.36

(56) References Cited

U.S. PATENT DOCUMENTS

| | | | | |
|---|---|---|---|---|
| 4,807,210 A | * | 2/1989 | Kaku et al. ............ | 369/44.31 X |
| 4,866,688 A | * | 9/1989 | Ohtake et al. ............ | 369/44.13 |
| 5,027,336 A | * | 6/1991 | Sugiura .................... | 369/44.13 |
| 5,247,501 A | * | 9/1993 | Hashimoto et al. ....... | 369/44.11 |
| 5,383,169 A | * | 1/1995 | Shinoda et al. ........ | 369/44.35 X |
| 5,440,534 A | | 8/1995 | Eastman et al. | |
| 5,508,991 A | * | 4/1996 | Onigata et al. .......... | 369/44.13 |
| 5,646,919 A | | 7/1997 | Eastman et al. | |
| 5,663,941 A | | 9/1997 | Aoshima | |
| 5,689,485 A | * | 11/1997 | Ceshkovsky ........ | 369/44.35 X |
| 5,703,849 A | * | 12/1997 | Noda .................... | 369/44.35 X |
| 5,875,157 A | * | 2/1999 | Sasaki et al. ........ | 369/44.35 X |
| 5,878,007 A | * | 3/1999 | Matsumoto et al. ..... | 369/44.34 |
| 5,920,528 A | * | 7/1999 | Ohshima et al. ...... | 369/44.35 X |
| 5,978,333 A | * | 11/1999 | Kobayashi et al. .. | 369/44.35 X |
| 5,991,248 A | * | 11/1999 | Hong ...................... | 369/44.28 |
| 6,084,835 A | * | 7/2000 | Buchler et al. .......... | 369/44.32 |
| 6,134,198 A | * | 10/2000 | Yamamoto et al. .. | 369/44.36 X |
| 6,266,305 B1 | * | 7/2001 | Buchler ................... | 369/44.32 |

FOREIGN PATENT DOCUMENTS

| | | | | |
|---|---|---|---|---|
| EP | 0 371 880 A2 | 11/1989 | | |
| EP | 0 831 468 A2 | 3/1998 | | |
| JP | 57-053840 | 3/1982 | | |
| JP | 40-5054410 | * 3/1993 | .............. | 369/44.13 |
| JP | 05-290390 | 5/1993 | | |
| JP | 40-5144029 | * 6/1993 | .............. | 369/44.13 |
| JP | 40-6068505 | * 3/1994 | .............. | 369/44.13 |
| JP | 40-6195735 | * 7/1994 | .............. | 369/44.13 |
| JP | 07-201058 | 8/1995 | | |

OTHER PUBLICATIONS

MAT of JP 6–195735, Derwint,/Thompson Scientific.*
MAT of JP 6–8505, DerwentThomsan Scientific.*
MAT of JP 5–54410, Derwent,/Thomsaon Scientific.*

* cited by examiner

*Primary Examiner*—Aristotelis M Psitos
(74) *Attorney, Agent, or Firm*—Pillsbury Winthrop LLP

(57) ABSTRACT

In recording on an optical disk, tracking control is performed using tracking error signals detected during an OFF period and a rear time segment within an ON period of a recording pulse signal. The time segment for detecting the tracking error signal within the recording pulse ON period is variably controlled in accordance with recording conditions such as a disk type and recording speed. This control can effectively prevent a tendency of pits being formed off the center line of a track toward the inner circumference of the optical disk due to the influence of residual heat from an adjoining inner track, thereby allowing pits to be formed accurately on and along the track center line. Further, during recording, a detection is made of a wobble-corresponding component contained in an HF signal corresponding to reflections of a recording light beam from the optical disk, and servo-balance adjusting variable resistors are adjusted on the basis of the detected wobble-corresponding component in such a way that the detected component presents its minimum level.

1 Claim, 15 Drawing Sheets

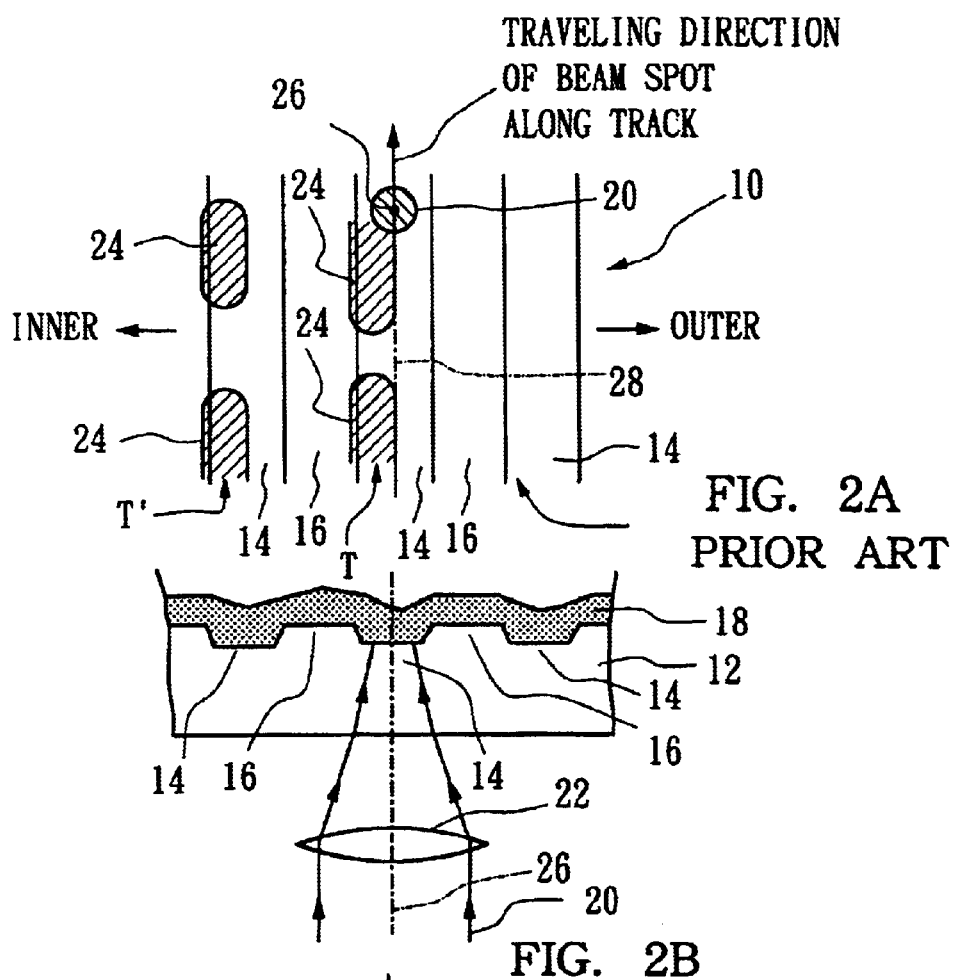
FIG. 2A PRIOR ART
FIG. 2B
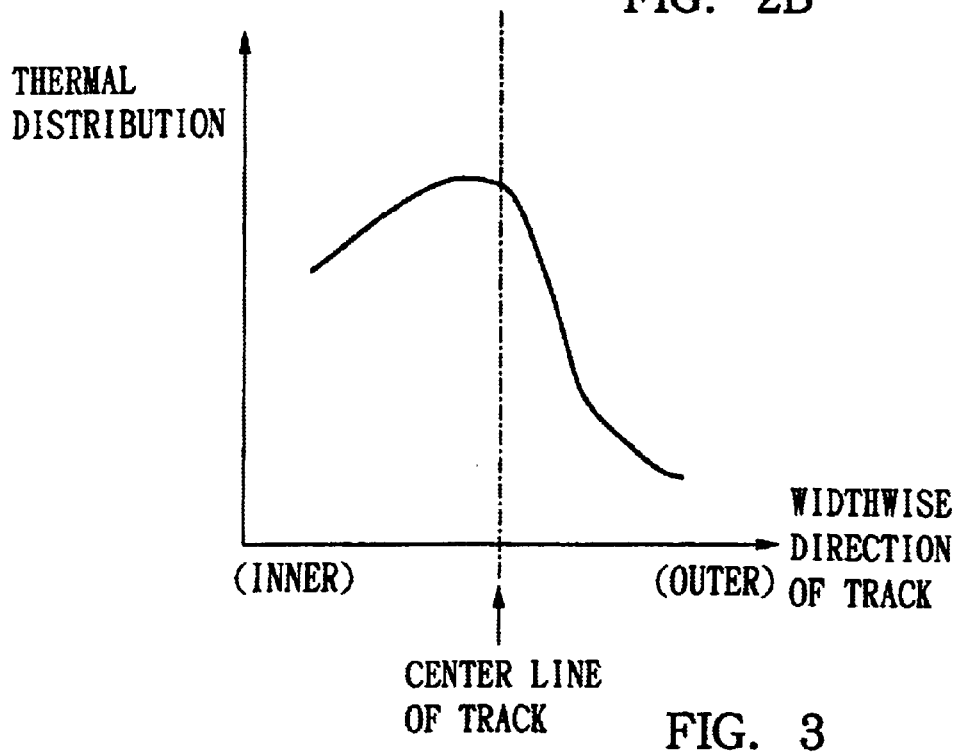
FIG. 3

TRACKING ERROR SIGNAL

OPTICAL DISK RECORDING TECHNIQUE CAPABLE OF FORMING PITS ACCURATELY CENTERED ON TRACK AND SERVO-BALANCE ADJUSTING TECHNIQUE FOR OPTICAL DISK RECORDING

This is a divisional of U.S. Pat. Ser. No. 09/249,660, filed Feb. 12, 1999, pending.

BACKGROUND OF THE INVENTION

The present invention generally relates to methods and devices for recording information on an optical disk based on a mark-length recording scheme, where pits are formed sequentially from the inner circumference to the outer via a light beam irradiated onto a track in the form of a groove or land running on the disk's recording surface. More particularly, the present invention relates to an improved optical disk recording method and device which can form pits accurately on and along the center line of the optical disk track.

The present invention also relates to servo-balance adjusting methods and servo-balance detecting devices for optical disk recording and optical disk recording devices which are directed to achieving enhanced recording signal quality by optimizing servo balance in focus servo, tracking servo and the like for recording on an optical disk. More particularly, this invention relates to a technique for readily adjusting the servo balance with high accuracy.

In write-once optical disks such as CD-R (CD-Recordable) and DVD-R (DVD-Recordable) as well as rewritable optical disks such as CD-RW (CD-Rewritable), DVD-RAM and MO (Magneto Optical disk), guide grooves commonly called "grooves" or "pre-grooves" are previously formed. Pits are formed sequentially in a track in the form of such a groove or land (a portion between adjoining grooves) by irradiating a laser light beam onto the rotating disk along the track. In recording on such optical disks, tracking control to allow the laser light beam along the track has been performed conventionally in such a way that the center of the optical axis of the laser light beam strikes the center line of the track when a tracking error signal is at a zero level.

Experiments conducted by the inventor of the present invention have shown that, in high-speed recording such as at six-times (i.e., six times faster than the normal speed), eight-times or higher speed as well as in high-density recording with a track pitch (spacing between adjoining tracks) narrower than the normal pitch, pits tend to be formed off the center line of the track even when the laser light beam is irradiated with the center of its optical axis accurately positioned at the track center line, as explained below in relation to FIG. 2.

In FIG. 2, there is shown a write-once optical disk 10 having a dye layer, where a transparent substrate 12 has grooves 14 previously formed therein and running helically around the central axis of the disk 10. Lands 16 are formed between adjoining grooves 14. The dye layer 18 functioning as a recording layer is formed on or films the transparent substrate 12, and reflective, protective and other layers (not shown for simplicity of illustration) are laminated on the dye layer 18. To record information on the optical disk 10, laser light 20, whose intensity is modulated by a recording signal, is converged via an objective lens 22 and passes through the transparent substrate 12 onto the track (groove 14 in this example), to thereby form a pit 24 therein. At that time, the tracking control is performed so as to allow the center 26 of the optical axis of the laser light beam 20 to be positioned on the center line of the track.

However, if high-speed or high-density recording is effected with such conventional tracking control, the pit 24 tends to be formed off the track center line 28 of the track T toward the inner circumference of the disk, due to the influence of residual heat from an adjoining track T', located inward of the currently recorded track T, where recording has taken place immediately before the current recording. This positional deviation of the pit formed would lead to various inconveniences such as deterioration of the recording sensitivity and reproduced signal quality. Degree of the pit's positional deviation varies depending on the type of the disk used (such as the material used for the recording layer and the track pitch) and the recording speed (linear velocity of the disk as well as a selected "recording speed magnification").

Further, in such optical disk recording, focus servo and tracking servo are each implemented by first determining a servo error through predetermined arithmetic operations between reflected light reception signals representative of a reflection of the recording laser light beam from the optical disk and then driving a servo actuator to minimize the error. In the predetermined arithmetic operations, servo-balance adjustment is made which is intended to adjust the levels of the reflected light reception signals relative to each other. The servo balance needs to be adjusted with high accuracy, because the quality and characteristics (such as a jitter characteristic) of recording signals are greatly affected depending on how the servo balance is adjusted.

FIG. 13 is explanatory of the servo balance adjustment employed in the conventional focus servo and tracking servo control (the focus servo balance adjustment is for changing the depth of the light beam focus), and more particularly showing an HF (High Frequency) signal waveform corresponding to the reflected light reception signals that represent the light beam reflection from the optical disk during recording. The HF signal waveform would present, in its falling phase, a different downward curve depending on the servo balance setting, and the sharpest downward curve generally represents an optimum servo balance setting. Thus, in plants manufacturing optical disk recording devices, it has been conventional for human operators to detect when a sharpest downward curve of the HF signal waveform appears on an oscilloscope while manipulating focus-servo-balance and tracking-servo-balance adjusting variable resistors, and fix these variable resistors at positions where the sharpest downward slope could be obtained.

However, with such conventionally servo balance adjustment, it was difficult to visually determine the sharpest downward curve of the HF signal waveform, so that the servo balance adjustment values would considerably vary depending on the human operator in charge and servo balance adjustment could not be made optimally. Automatization of the servo balance adjustment was also difficult to realize with the conventional approach. Further, an optimum focus servo balance providing an optimum focus depth of the laser beam light was not easy to achieve, since the kind and film thickness of the dye vary depending on the type of the optical disk. Similarly, an optimum tracking servo balance varies depending on the type of the optical disk. In addition, because the servo balance adjustment was already completed and fixed prior to shipment of the recording devices from the plants, the servo balance could not be adjusted freely by users depending on the type of a disk they want to use.

SUMMARY OF THE INVENTION

It is therefore a first object of the present invention to provide an optical disk recording method and device which can form pits accurately centered on the center line of a recording track.

It is a second object of the present invention to provide a servo-balance adjusting method and servo-balance detecting device for optical disk recording and an optical disk recording device which can readily adjust servo balance with high accuracy and also permit adjustment of the servo balance in actual use by users.

According to an aspect of the present invention, there is provided an optical disk recording method for recording information on an optical disk, based on a mark-length recording scheme, by forming pits sequentially from an inner circumference to an outer circumference of the optical disk via a light beam irradiated onto a track formed as a groove or land on a recording surface of the optical disk, and this optical disk recording method is characterized in that tracking control is performed in such a way that a center of an optical axis of the light beam is offset, by a predetermined amount, from a center line of the track toward the outer circumference of the optical disk. Because the tracking control is performed to cause the optical axis center of the irradiated light beam to be offset, by a predetermined amount, from the track center line toward the disk's outer circumference, the optical disk recording method of the present invention can effectively avoid an unwanted tendency of pits being formed off the track center line toward the inner circumference of the optical disk due to the influence of residual heat from an adjoining inner track, thereby allowing pits to be formed accurately on and along the track center line.

The above-mentioned tracking control causing the light beam to be offset toward the disk's outer circumference can be realized, for example, by appropriately setting a time period for detecting a tracking error signal to be used in the tracking control. As typically disclosed in Japanese Patent Laid-open Publication No. HEI-1-325634, the traditional tracking control for optical disk recording was performed using a tracking error signal detected only during an OFF (low-level) period of a recording pulse signal, excluding an ON (high-level) period of the recording pulse signal (i. e., a period for forming a pit with the laser light beam raised to a high recording-power level). According to such traditional tracking control, the laser light beam is controlled so that the center of its optical axis remains positioned on the center line of the track, because no influence of residual heat from an adjoining inner track appears in the tracking error signal detected during the OFF period alone. Thus, the traditional tracking control encountered the problem that pits would be formed off the track center line toward the inner circumference of the disk.

In FIG. 3, there is illustrated thermal distribution across the width of the track during optical recording thereon. The track being recorded ("currently-recorded track") is subject to residual heat from an adjoining inner track. FIG. 4 shows how the residual heat from the already-recorded adjoining inner track affects the currently-recorded track. If the recording is effected with the influence of the residual heat left unremoved, a portion of a pit, closer to the inner edge of the currently-recorded track, is formed more efficiently, so that a reflection from that inner portion of the pit will have a reduced light amount as denoted by a dotted-line curve in section (b) of FIG. 4. Thus, even when the optical axis of the laser light remains positioned on the center line of the track, there would be caused a significant difference in light amount between the reflection from the inner portion of the track and the reflection from the outer portion of the track as denoted by a solid-line curve in section (b) of FIG. 4, which would lead to an increased level of the tracking error signal. Note that a hatched portion in section (b) of FIG. 4 represents energy which is consumed to cause variation in the dye layer.

To avoid the inconvenience, the optical disk recording method of the present invention uses, as the time segment for detecting a tracking error signal to be used in the tracking control, a whole or part of a particular time segment within an ON period of the recording pulse signal after formation of a pit is initiated and a reflection of the light beam from the optical disk passes a peak level (the peak level is not used because of its instability), in addition to a whole or part of a time segment within an OFF period of the recording pulse signal. With the combined use of the two time segments within the ON and OFF periods, the influence of the residual heat is fed back to the tracking control to thereby produce a d.c. offset in the tracking error signal, so that the laser light beam is controlled to cause the center of its optical axis to be offset from the track center line by a predetermined amount. This arrangement can form pits centered accurately on the track. Also, according to the present invention, the length of the tracking-error-signal detecting time segment within the ON period of the recording pulse signal, for use in the tracking control, is varied depending on current recording conditions such as the type (material used for forming the recording layer, track pitch, etc.) of the optical disk and recording speed (linear velocity of the disk and selected recording speed magnification). With such variation in the time segment length, it is possible to attain an optimum offset amount corresponding to the current recording conditions, so that pits can always be formed accurately on and along the track center line, which would achieve greatly enhanced recording sensitivity and recording signal quality.

It is preferable that the tracking-error-signal detecting time segments within the ON and OFF periods of the recording pulse signal be continuous, although they may be discontinuous in some applications. By varying a start point of the tracking-error-signal detecting time segment within the ON period in accordance with the current recording conditions such as the disk type and recording speed, timing control of the tracking-error-signal detecting time segments can be greatly facilitated. Because the entire length of the tracking-error-signal detecting time segments is great as compared to the case where the tracking error signal is detected only within the OFF period of the recording pulse signal, the optical disk recording method of the present invention also can significantly increase the possibility of detecting information, such as ATIP signal, FM-recorded on wobbling portions (periodic winds or snake-like turns) of the track.

According to another aspect of the present invention, there is provided an optical disk recording device where the tracking-error-signal detecting time segments within the ON and OFF periods of the recording pulse signal are continuously interconnected, and which comprises: a tracking signal generating section that sequentially outputs a detected tracking error signal during a particular period from a given time point after formation of a pit is initiated in response to turning-on of a recording pulse signal and a reflection of the light beam from the optical disk passes a peak level to a subsequent time point when the recording pulse signal is turned on next, and that, during a period other than the particular period, either holds a level of the tracking error signal detected immediately before the particular period or outputs a zero-level tracking error signal, the tracking signal generating section smoothing the tracking error signal to thereby provide the smoothed tracking error signal as a tracking signal; and a control section that performs tracking control using the tracking signal provided by the tracking signal generating section. The optical disk recording device may also include a section for varying the start point of the tracking-error-signal detecting time segments.

The present invention also provides an optical disk recording device characterized by imparting an separately-generated offset signal to a tracking signal, in stead of expanding the tracking-error-detecting time segment. More specifically, the optical disk recording device comprises: a tracking signal generating section that sequentially outputs a detected tracking error signal during a particular period when a recording pulse signal is in an OFF state or no pit is being formed, and that, during a period other than the particular period, either holds a level of the tracking error signal detected immediately before the particular period or outputs a zero-level tracking error signal, the tracking signal generating section smoothing the tracking error signal to thereby provide the smoothed tracking error signal as a tracking signal; an offset imparting section that imparts an offset to the tracking signal; a storage section that stores information indicative of optimum offset values corresponding to various possible recording conditions such as a disk type or recording speed or a combination of the disk type and recording speed; and a control section that reads out one of the optimum offset values corresponding to current recording conditions and setting the offset, to be imparted by the offset imparting section, to the read-out offset value, and performs tracking control using the tracking signal having the offset imparted thereto.

The present invention also provides an optical disk recording device characterized by a combined use of the expansion of the tracking-error-signal detecting time segment and the impartment of the offset signal. More specifically, the optical disk recording device comprises: a tracking signal generating section that sequentially outputs a detected tracking error signal during a particular period from a given time point after formation of a pit is initiated in response to turning-on of a recording pulse signal and a reflection of the light beam from the optical disk passes a peak level to a subsequent time point when the recording pulse signal is turned on next, and that, during a period other than the particular period, either holds a level of the tracking error signal detected immediately before the particular period or outputs a zero-level tracking error signal, the tracking signal generating section smoothing the tracking error signal to thereby provide the smoothed tracking error signal as a tracking signal; an offset imparting section that imparts an offset to the tracking signal; a storage section that stores information indicative of optimum offset values corresponding to various possible recording conditions; and a control section that reads out one of the optimum offset values corresponding to current recording conditions and setting the offset, to be imparted by the offset imparting section, to the readout offset value, and performs tracking control using the tracking signal having the offset imparted thereto. In this case too, the optical disk recording device may include a section for varying the start point of the tracking-error-signal detecting time segments.

Generally, in the recording surface of recordable optical disks, there are formed, as recording tracks, guide grooves (pre-grooves) each winding or wobbling in predetermined cycles. These periodic windings are commonly known as "wobbles". Experiments by the inventor of the present invention has discovered that the level of a wobble (more specifically, wobble-corresponding) component, contained in reflected light reception signals generated by receiving a reflection of the irradiated light beam from the optical disk, varies with a change of servo balance setting and that the servo balance achieving a lowest level of recording signal jitter substantially coincides with the servo balance achieving a lowest level of the wobble-corresponding component. Thus, the present invention is intended to achieve optimum servo balance adjustment on the basis of the discovered fact.

Namely, according to still another aspect of the present invention, there is provided a servo-balance adjusting method for use with an optical disk recording device for recording information by irradiating a laser light beam onto an optical disk having a track wobbling in predetermined cycles. The servo-balance adjusting method comprises the steps of: detecting a wobble component, corresponding to the frequency of the wobbles of the track, contained in reflected light reception signals generated by receiving a reflection of the laser light beam from the optical disk during recording on the optical disk; and adjusting level balance between the reflected light reception signals for use in calculation of a servo error in such a way that the wobble component detected by the step of detecting presents a substantially minimum level. Because whether or not the servo balance is optimum is ascertained on the basis of the level of the wobble component, the thus-arranged servo-balance adjusting method of the invention can adjust the servo balance in an optimum condition more readily and more accurately than the conventional approach where the servo balance condition is ascertained from the HF signal waveform.

The present invention also provides an optical disk recording device which comprises: an optical head that irradiates a recording laser light beam onto an optical disk for recording of information thereon and receives a reflection of the laser light beam from the optical disk to provide reflected light reception signals; a wobble component detecting section that detects a wobble component, corresponding to a wobble of a track on the optical disk, contained in the reflected light reception signals during the recording on the optical disk; a servo error detecting section that detects a servo error by performing arithmetic operations between the reflected light reception signals; a servo section that corrects the servo error by driving a servo actuator on the basis of the servo error detected by the servo error detecting section; an adjusting section that adjusts level balance between the reflected light reception signals to be used in the arithmetic operations performed by the servo error detecting section; and a control section that automatically adjusts the level balance between the reflected light reception signals by controlling the adjusting section in such a way that the wobble component detected by the wobble component detecting section presents a substantially minimum level.

Further, the present invention provides an optical disk recording device which comprises: an optical head that irradiates a recording laser light beam onto an optical disk for recording of information thereon and receives a reflection of the laser light beam from the optical disk to provide reflected light reception signals; a wobble component detecting section that detects a wobble component, corresponding to a wobble of a track on the optical disk, contained in the reflected light reception signals during the recording on the optical disk; a display that displays a level of the wobble component detected by the wobble component detecting section; a servo error detecting section that detects a servo error by performing arithmetic operations between the reflected light reception signals; a servo section that corrects the servo error by driving a servo actuator on the basis of the servo error detected by the servo error detecting section; an adjusting section that adjusts level balance between the reflected light reception signals to be used in the arithmetic operations performed by the servo error detecting section; and a level balance adjusting operator that is operable to manually adjust the level balance between the reflected light reception signals by controlling the adjusting section in such a way that the wobble component detected by the wobble component detecting section presents a substantially minimum level.

With the two optical disk recording devices arranged in the above-mentioned manner, the servo balance adjustment can be made as desired by users depending on the type of an optical disk they want to use. It will be appreciated that the optical disk recording device of the present invention may comprise an optical disk drive operating singly or in combination with a personal computer. In the latter case, the optical disk drive may include a level balance adjusting circuit and a level balance adjusting operator, while the personal computer may includes a control circuit and a display.

Moreover, the present invention provides a servo balance detecting device suitable for use with an optical disk recording device which is not itself equipped with facilities necessary for servo balance adjustment. Namely, this servo balance detecting device comprises: an input terminal section that receives reflected light reception signals corresponding to a reflection of a recording laser light beam irradiated by an optical disk recording device onto an optical disk; a wobble component detecting section that detects a wobble component, corresponding to a wobble of a track on the optical disk, contained in the reflected light reception signals received via the input terminal section; and a display that displays a level of the wobble component detected by the wobble component detecting section.

As will be apparent from the following description, the present invention arranged as above is applicable to servo balance adjustment in optical disk recording devices for various types of optical disk, such as CD-R, CD-RW, DVD-R, DVD-RAM and MO.

BRIEF DESCRIPTION OF THE DRAWINGS

For better understanding of the above and other features of the present invention, preferred embodiments of the invention will hereinafter be described in greater detail with reference to the accompanying drawings, in which:

FIGS. 2A and 2B are a plan view and a sectional view explanatory of conventional tracking control and more particularly showing pits formed off the center line of a track due to residual heat from an adjoining inner track;

FIG. 3 is a graph illustrating thermal distribution across the width of a track during optical recording on a track;

FIGS. 20A and 20B are diagrams showing another embodiment of the optical disk recording device arranged to permit servo balance adjustment through manual operation, of which FIG. 20A shows a front panel and FIG. 20B shows an internal structure of the device; and FIGS. 21A and 21B are diagrams of a servo balance detecting device embodying a fifth embodiment of the present invention, of which FIG. 21A is an external view of the device and FIG. 21B shows an internal structure of the device.

DETAILED DESCRIPTION OF THE PREFERRED EMBODIMENTS

[FIRST EMBODIMENT]

Figure 5:
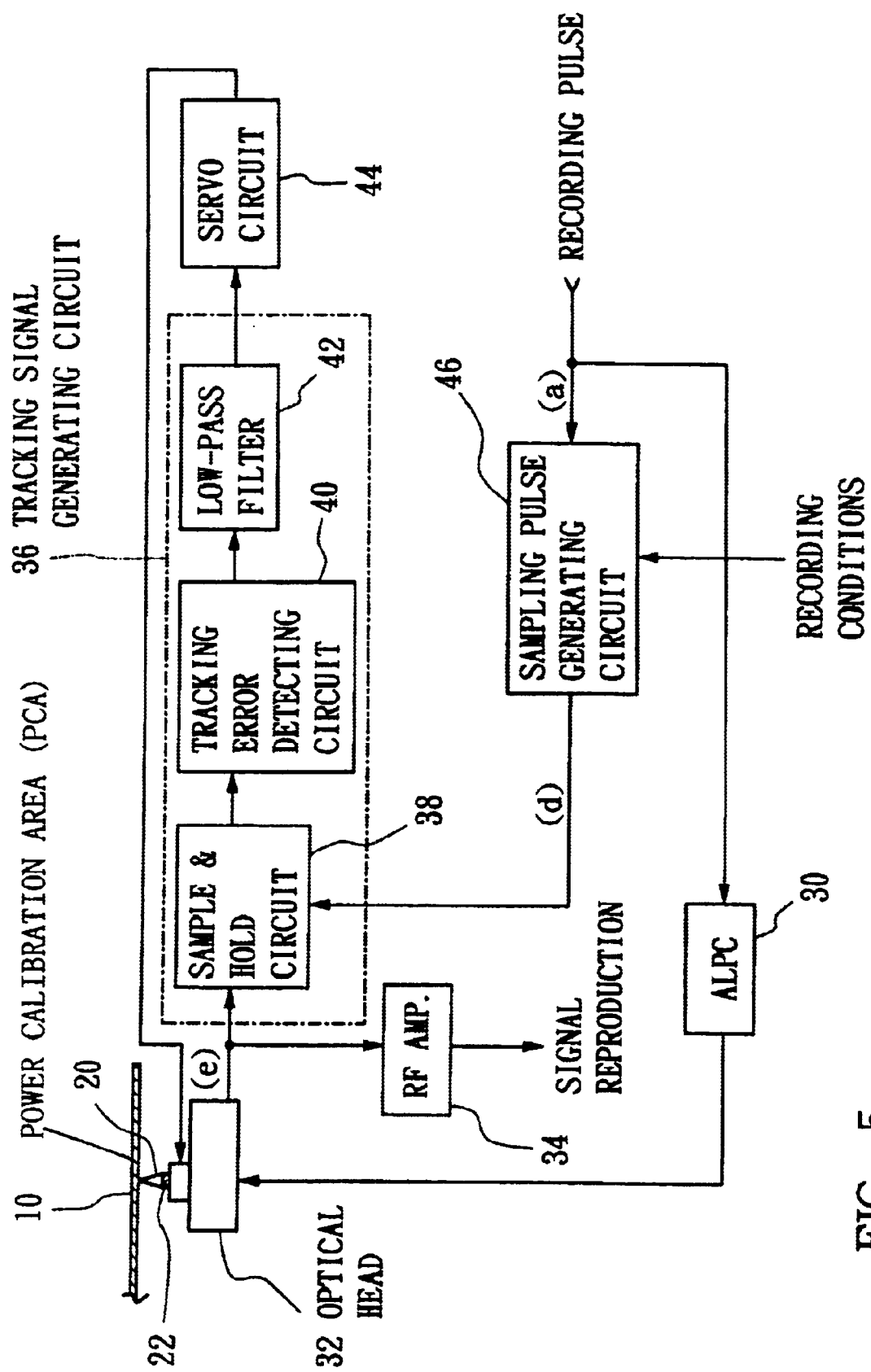
FIG. 5 is a block diagram showing a exemplary structure of the optical disk recording device of the present invention and more particularly various components for performing tracking control in the device.

Referring first to FIG. 5, there is shown an optical disk recording device in accordance with a first embodiment of the present invention and more particularly various components for performing tracking control in the device. Recording pulse is fed to an ALPC (Automatic Laser Power Control) circuit 30 for stabilization of its optical level and then passed to an optical head 32 to drive a laser diode contained therein. Recording laser light 20 output from the laser diode is converged through an objective lens 22 and irradiated onto the recording surface of an optical disk 10 such as a CD-R. The irradiated laser light beam acts on a dye layer or recording layer of the optical disk 10 to form pits therein for recording of desired information. At that time, a reflection of the recording laser light 20 from the optical disk 10 passes through the objective lens 22 to be received by light-receiving elements within the optical head 32. Reflected light reception signals output from the light-receiving elements are passed through an RF amplifier 34 to a signal reproduction processing circuit (not shown) for necessary processing.

The reflected light reception signals are also sent to a tracking signal generating circuit 36. In the tracking signal generating circuit 36, a sample and hold circuit 38 extracts respective appropriate segments of the signals, a tracking-error detecting circuit 40 detects a tracking error on the basis of the extracted segments to provide a tracking error signal, and the tracking error signal is then smoothed by a low-pass filter 42 to generate a tracking signal. The tracking signal is fed to servo circuit 44, comprising for example a digital servo circuit, which performs tracking control by driving a tracking actuator within the optical head 32 in such a manner that the absolute value of the tracking signal decreases.

Sampling pulse generating circuit 46 processes the recording pulse signal to generate sampling pulses to be used by the sample and hold circuit 38. Duration of the sampling pulses (sampling time) is variably controlled in accordance with various recording conditions such as the type of the disk and recording speed (linear velocity of the disk as well as a selected recording speed magnification).

Figure 6:
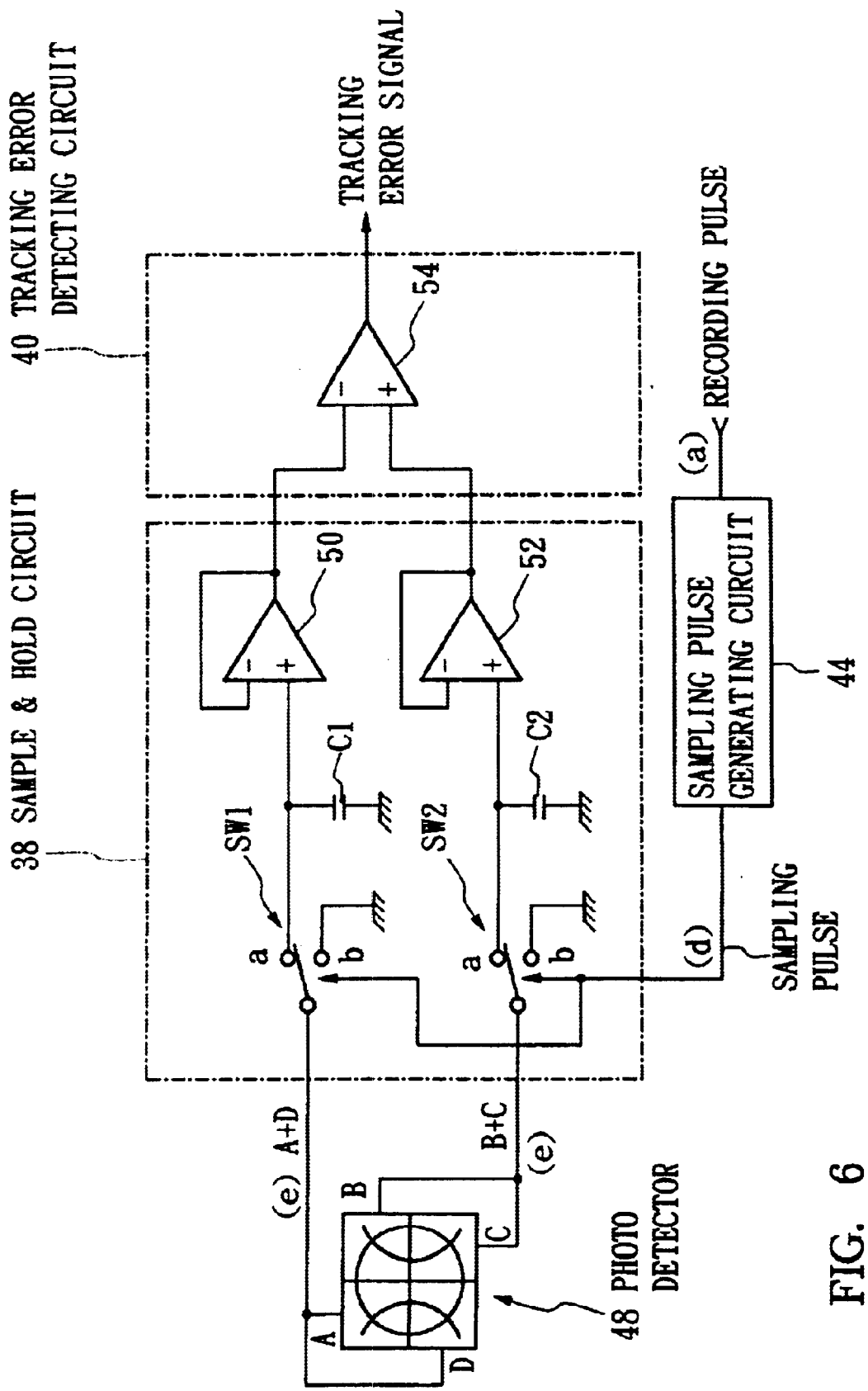
FIG. 6 is a block diagram showing exemplary structures of a sample and hold circuit and a tracking error detecting circuit of FIG. 5.

FIG. 6 is a block diagram more fully showing exemplary structures of the above-mentioned sample and hold circuit 38 and tracking error detecting circuit 40. Photo detector 48 comprises a quadruple PIN photo diode which forms the light-receiving elements for receiving reflections of the laser light 20 from the optical disk 10. The following description is made in relation to a case where the tracking control is performed using the known push-pull method. Reflected light reception signals A and D, output from the two light-receiving elements for receiving the reflections from inner portions of the currently-recorded track, are added together to be sent to the sample and hold circuit 38 as an "A+D" reflected light reception signal. Similarly, reflected light reception signals B and C, output from the other two light-receiving elements for receiving the reflections from outer portions of the currently-recorded track, are added together to be sent to the sample and hold circuit 38 as a "B+C" reflected light reception signal.

When switches SW1 and SW2 are ON (during the sampling/holding time), the sample and hold circuit 38 allows the "A+D" and "B+C" reflected light reception signals to pass therethrough, but when the switches SW1 and SW2 are OFF (during the holding time), the circuit 38 holds, in holding condensers C1 and C2, respective values of the "A+D" and "B+C" reflected light reception signals immediately before the switches SW1 and SW2 was turned off. The light signals sampled and held in the abovementioned manner are output via corresponding buffer amplifiers 50 and 52. The two output signals from the sample and hold circuit 38 are given to a subtracter 54, constituting the above-mentioned tracking-error detecting circuit 40, which determines a difference between the output signals to thereby generate a tracking error signal ("B+C"−"A+D").

Figure 7:
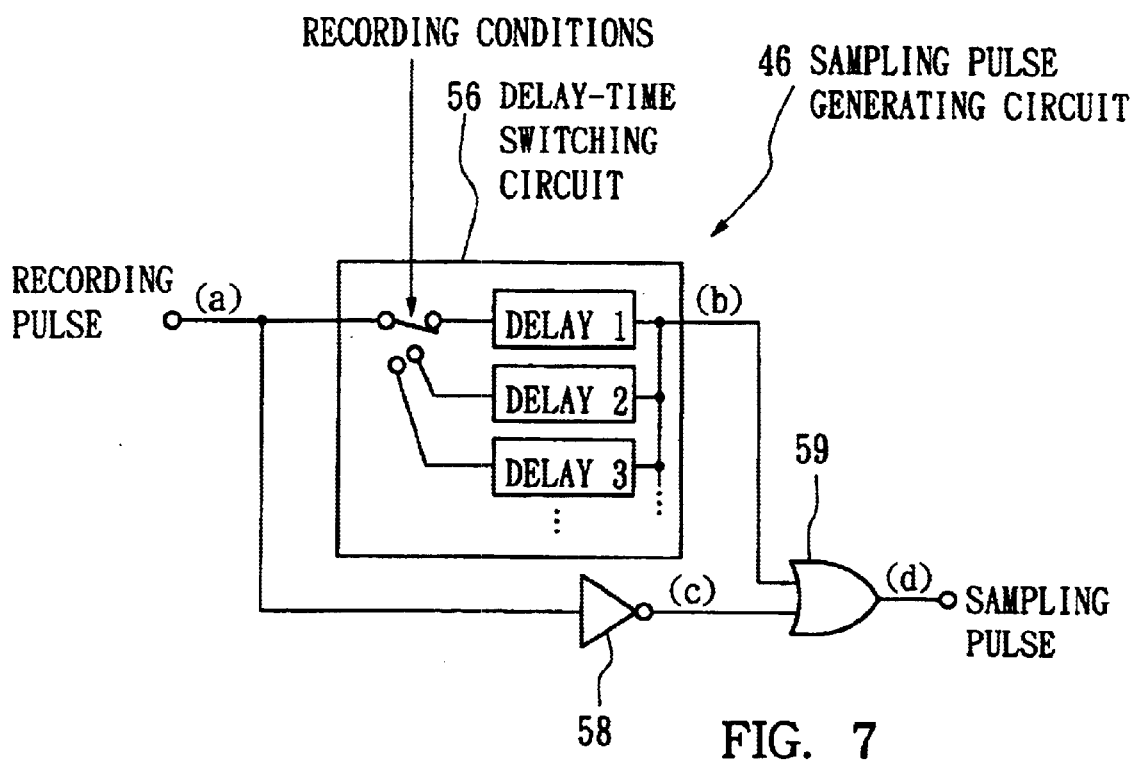
FIG. 7 is a block diagram showing in detail an exemplary structure of a sampling pulse generating circuit shown in FIGS. 5 and 6.
Figure 8:
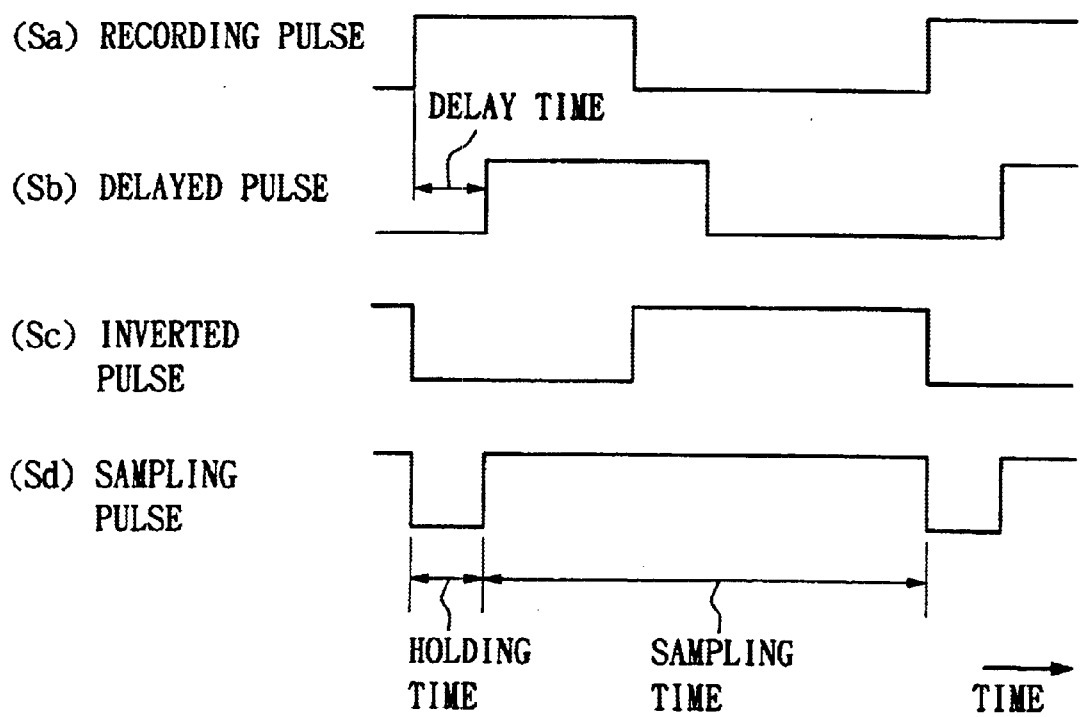
FIG. 8 is a chart showing various signal waveforms found in different parts of the sampling pulse generating circuit of FIG. 7.

In FIG. 7, there is shown in detail an exemplary structure of the sampling pulse generating circuit 46 that generates a sampling pulse for controlling the switches SW1 and SW2 of the sample and hold circuit 38. The sampling pulse generating circuit 46 includes a delay-time switching circuit 56 that delays the recording pulse by a selected time. Specifically, various delay time values are set in the delay-time switching circuit 56 so that one of the delay time values is selected depending on the current recording conditions such as the disk type and recording speed. In the meantime, the recording pulse is inverted by an inverter 58, and a delayed pulse from the delay-time switching circuit 56 and the inverted pulse from the inverter 58 are added via an OR circuit 59 to thereby provide a sampling pulse. Sections (Sa) to (Sd) of FIG. 8 show various signal waveforms found at points (a) to (d) of the sampling pulse generating circuit 46. The delay time value of the delayed pulse at point (b) determines a holding period of the sample and hold circuit 38; thus, the holding and sampling times can be varied by changing the delay time value.

Figure 1:
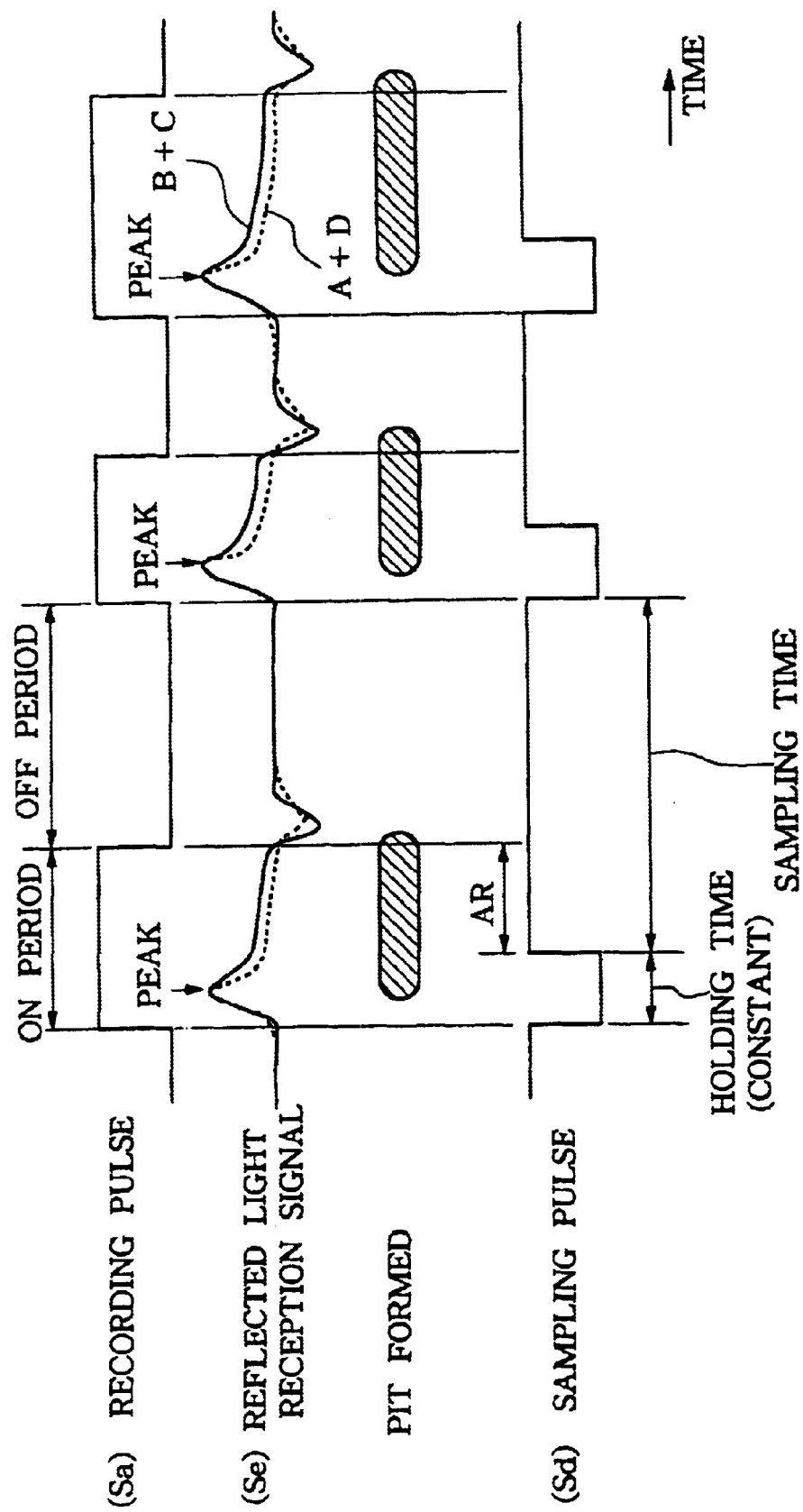
FIG. 1 is a diagram showing various signal waveforms found at different parts in an optical disk recording device in accordance with a first embodiment of the present invention.
Figure 4:
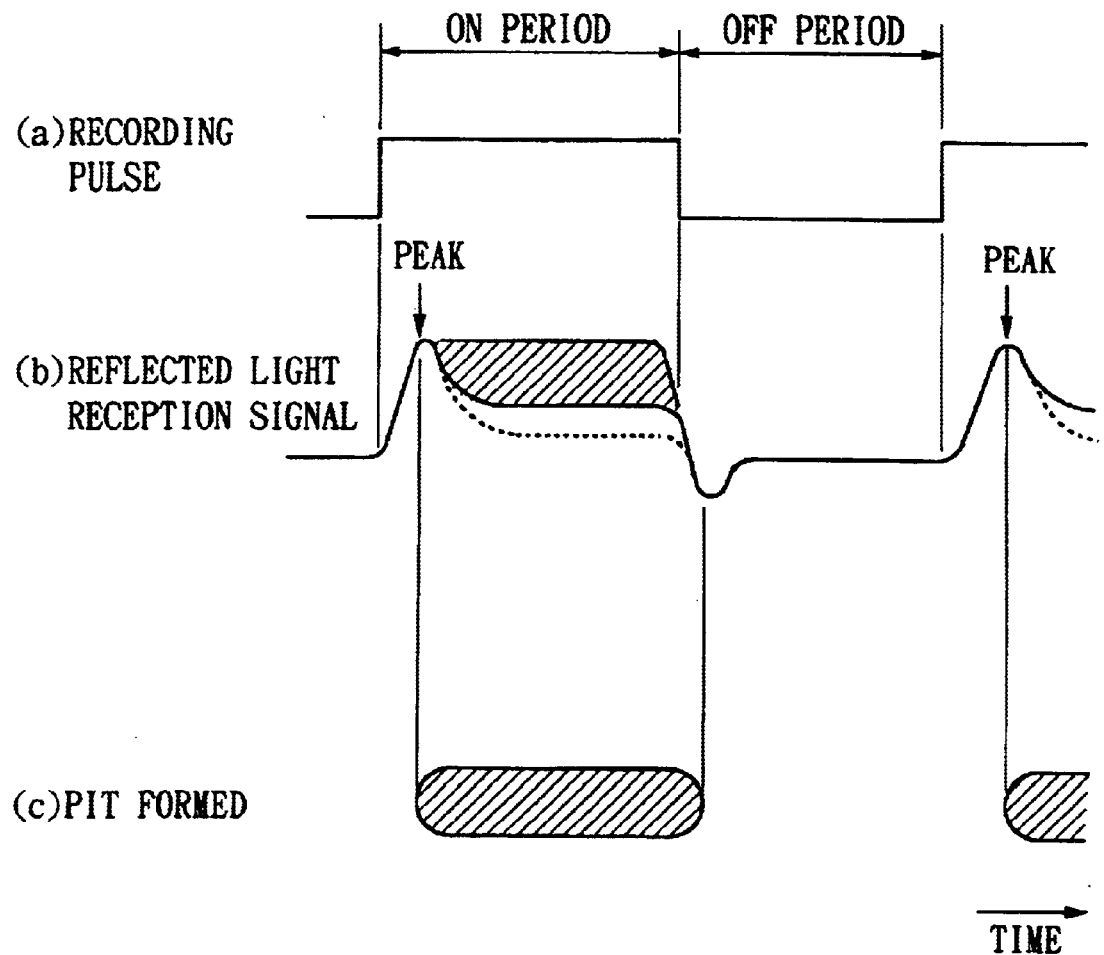
FIG. 4 is a chart showing how the residual heat from the adjoining inner track affects formation of pits.

FIG. 1 shows, in sections (Sa), (Sd) and (Se), various signal waveforms found at points (a), (d) and (e) in the circuitry of FIGS. 5 and 6, where same reference characters as those in FIG. 8 denote same signals The "A+D" and "B+C" light signals assume waveforms as shown in section (Sa), from which it will be seen that when influenced by residual heat from an adjoining track inward of the currently-recorded track, the "A+D" or inner reflected light reception signal (denoted in dotted line) in an ON period of the recording pulse signal becomes lower in level than the "B+C" or outer reflected light reception signal (denoted in solid line).

The sampling pulse (Sd) rises at a given time point after the reflected light reception signal starts declining from its peak level in the ON (high-level) period of the recording pulse signal (Sa), and then falls at the same time the recording pulse signal (Sa) is next turned on and starts rising in level). The rising timing of the sampling pulse (Sd) varies depending on the recording conditions, while the falling timing of the sampling pulse (Sd) remains constant. Thus, a rear segment of the recording pulse ON period is incorporated to the sampling time as denoted by a double-headed arrow AR in section (Sd). While the sampling pulse (Sd) is ON (in the high-level state) (i.e., during the sampling ti me), the switches SW1 and SW2 of FIG. 6 are each turned on by being connected to a "a" contact, so as to allow the "A+D" and "B+C" reflected light reception signals to pass through the sample and hold circuit 38. On the other hand, while the sampling pulse (Sd) is OFF (in the Low state) (during the holding time), the switch SW1 and SW2 of FIG. 6 are each turned off by being connected to a "b" contact, so that the "A+D" and "B+C" reflected light reception signals are blocked and the values of the "A+D" and "B+C" reflected light reception signals immediately before the blocking by the turning-off of the switches SW1 and SW2 are held by the condensers C1 and C2.

Generally, in the OFF period of the recording pulse signal, one of the "A+D" and "B+C" reflected light reception signals would become greater in level than the other reflected light reception signal due to a deviation of the laser light beam 20 off the center line of the currently-recorded track. Namely, if the laser light beam 20 deviates off the track center line inwardly or toward the inner circumference, the inner reflected light reception signal ("A+D") becomes greater in level than the outer reflected light reception signal ("B+C"); however, if the laser light beam 20 deviates outwardly or toward the outer circumference, then the outer reflected light reception signal ("B+C") becomes greater in level than the inner reflected light reception signal ("A+D").

Greater inward deviation of the laser light beam 20 relative to the currently-recorded track would result in a greater influence of the residual heat from the adjoining inner track, which decreases the level of the inner reflected light reception signal ("A+D"); conversely, a greater outward deviation of the laser light beam 20 would result in a smaller influence of the residual heat from the adjoining inner track, which therefore increases the level of the inner reflected light reception signal ("A+D").

Relation between the deviating direction of the laser light beam 20 and the corresponding level increase/decrease of the "A+D" and "B+C" reflected light reception signals in the ON period of the recording pulse signal is opposite to that in the OFF period of the recording pulse signal. However, the level of the "A+D" and "B+C" reflected light reception signals would normally be varied much more greatly by the residual heat from the adjoining inner track than by the tracking error itself. Thus, by setting an appropriate length of the recording pulse ON period that is to be incorporated into the sampling time, the residual heat influence can be a dominant factor of level variation of the tracking signal ("B+C"−"A+D") (i.e., the tracking error signal having been smoothed by the low-pass filter 42), corresponding to the deviation of the laser light beam 20 relative to the currently-recorded track. Namely, when the laser light beam 20 deviates off the track center line inwardly, the level decrease amount of the "A+D" reflected light reception signal in the recording pulse ON period becomes greater than the level increase amount of the same signal in the recording pulse OFF period, so that the tracking signal ("B+C"−"A+D") assumes a greater value. Conversely, when the laser light beam 20 deviates outwardly, the level increase amount of the "A+D" reflected light reception signal in the recording pulse ON period becomes greater than the level increase amount of the "B+C" reflected light reception signal in the recording pulse OFF period, so that the tracking signal ("B+C"−"A+D") assumes a smaller value.

Here, the servo circuit 44 is controlled to find a particular point where a minimum absolute value of the tracking signal ("B+C"−"A+D") is obtained; more specifically, the servo circuit 44 constantly monitors relation between a direction of radial displacement of the laser light beam 20 relative to the optical disk surface and the increase/decrease in the absolute value of the tracking signal ("B+C"−"A+D"), so as to shift the laser light beam 20, radially of the optical disk, in such a direction where the absolute value of the tracking signal is minimized. Thus, the laser light beam 20 is shifted radially outward relative to the track center line 28, so as to minimize the level of the tracking signal ("B+C"−"A+D"). As the laser light beam 20 is shifted radially outward, the influence of the residual heat from the adjoining inner track decreases and accordingly the level of the "A+D" reflected light reception signal increases, so that the tracking signal ("B+C"−"A+D") assumes a smaller value. However, as the laser light beam 20 is shifted closer to the outer circumference of the optical disk, the level of the "B+C" signal becomes gradually greater due to a tracking error while the ratio, of the level increase amount of the "A+D" signal, to the outward shift amount of the laser light beam 20 becomes gradually smaller. Accordingly, the level of the tracking signal ("B+C"−"A+D") turns, at a particular point, from a decreasing path to an increasing path.

Thus, the servo circuit 44 causes the laser light beams 20 to be placed in such an offset position as to achieve a minimized level of the tracking signal ("B+C"−"A+D"). Here, the offset amount of the laser light beam 20 is varied depending on the length of the ON-period segment of the recording pulse signal that is to be incorporated into the sampling time. Accordingly, by setting an appropriate length of the ON-period segment of the recording pulse signal (i.e., by modifying the rising timing of the sampling pulse), a pit can be formed accurately on and along the center line of the recording track.

Figure 9:
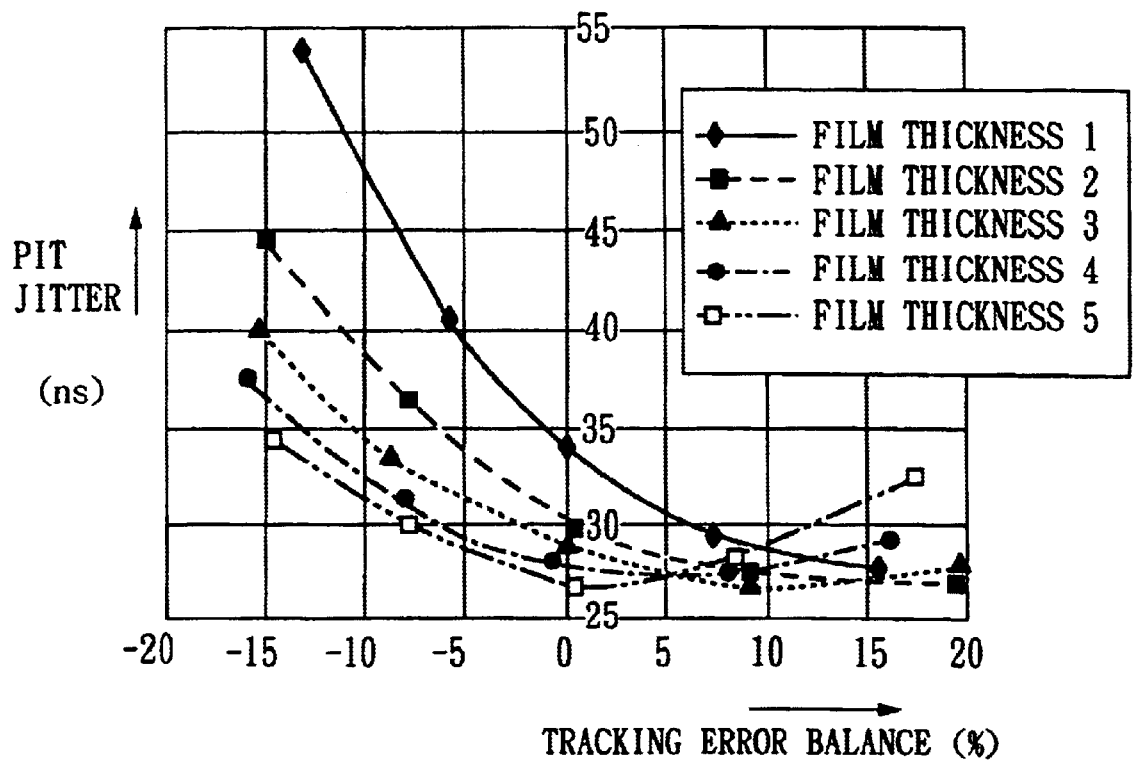
FIG. 9 is a graph showing exemplary relation between tracking error balance and pit jitter when recording is performed on high-density optical disks, each having a 1.15 μm track pitch but having a different dye layer film thickness, while variously changing the tracking error balance.
Figure 10:
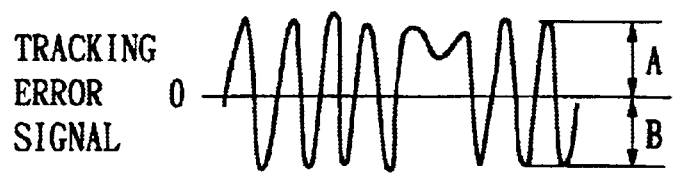
FIG. 10 is a waveform diagram of a tracking error signal explanatory of the tracking error balance.

FIG. 9 is a graph showing exemplary relation between tracking error balance and pit jitter when recording is performed on high-density optical disks, each having a 1.15 $\mu$m track pitch but having a different dye layer film thickness, while variously changing the tracking error balance. The "tracking error balance" is a value that represents the tracking error signal of FIG. 10 in the following mathematical expression:

$$\text{Tracking Error Balance} = [(A-B)/(A+B)] \times 50\%$$

In the example of FIG. 9, film thicknesses 1 to 5 decrease in the ascending order of the film thickness number; that is, film thickness 1 is the greatest of all, film thickness 2 is the second greatest, and so on. From the graph, it is seen that with greater film thicknesses, the tracking error balance value attaining minimum pit jitter would greatly deviate from 0% due to the residual heat from the adjoining inner track. Thus, according to the embodiment, with greater film thicknesses, the holding time length is made shorter (i.e., a shorter delay time is selected in the delay-time switching circuit 56 of FIG. 7). This approach can form pits accurately centered on the track center line, irrespective of the film thickness.

Because optical disks with a cyanine-based dye layer generally have a greater film thickness than those with a phtalocyanine-based dye layer, a greater offset amount of the laser light beam 20 is set for the former-type disks than for the latter-type disks.

In a situation where the offset amount of the laser light beam 20 is varied in accordance with a selected recording speed magnification, the residual heat from the adjoining inner track would influence more greatly as the selected recording speed gets higher, so that the embodiment is arranged to increase the offset amount in accordance with an increase in the recording speed. Further, if the recording to be effected is neither high-density recording nor high-speed recording, then the offset amount of the laser light beam 20 may be zero. In reproduction, the tracking signal is allowed to pass without being held anywhere in the sample and hold circuit 38. Further, the tracking servo and focus servo gains are set to high values during reproduction, but set to lower values during recording so as to prevent the servo loop from being saturated while the recording is in progress.

[SECOND EMBODIMENT]

Figure 11:
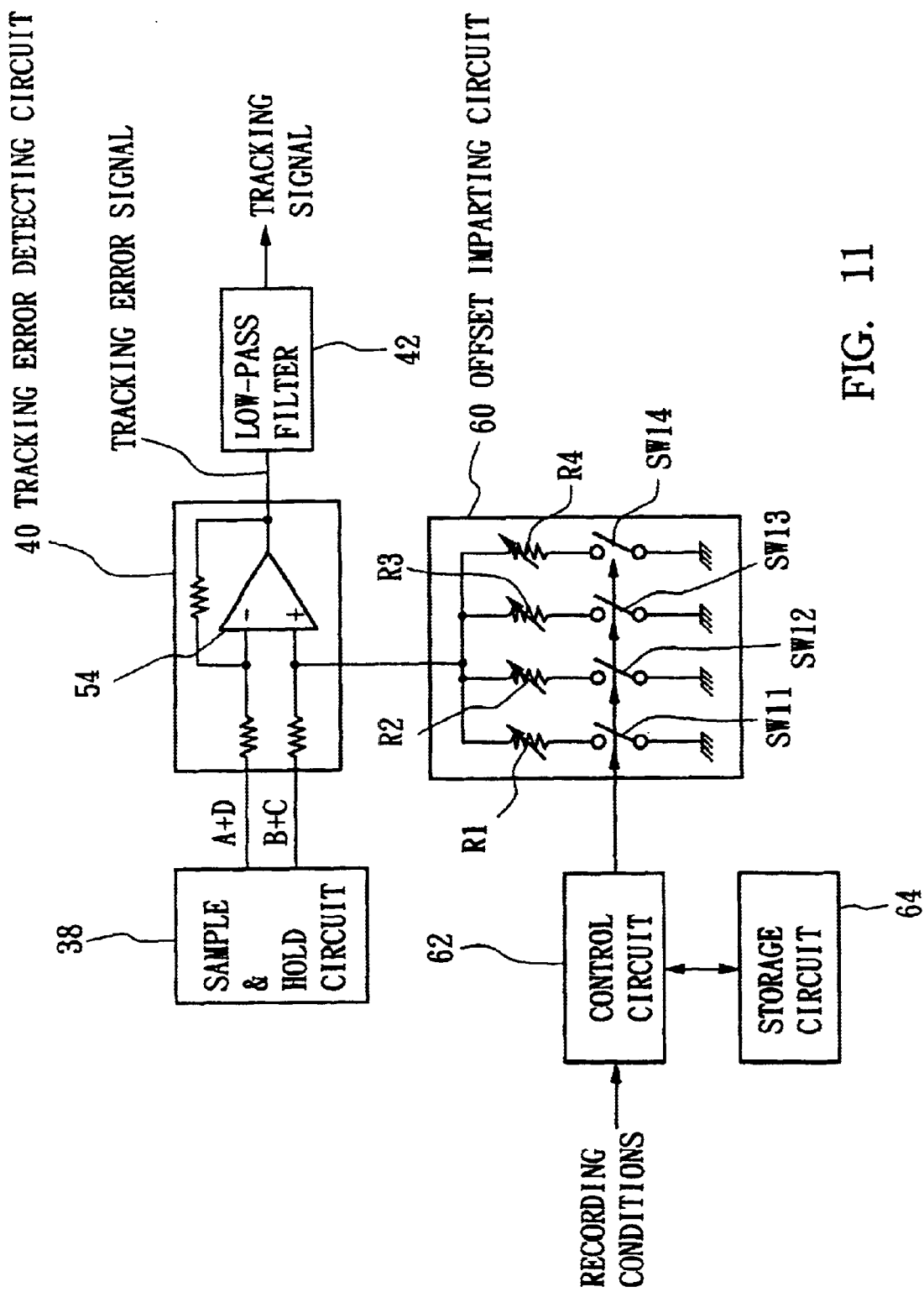
FIG. 11 is a block diagram showing an optical disk recording device in accordance with a second embodiment of the present invention.

The following paragraphs discuss an optical disk recording device in accordance with a second embodiment of the present invention with reference to FIG. 11, where same reference characters as in FIG. 5 denote same elements. Offset imparting circuit 60 includes a plurality of variable resistors R1 to R4 connected in parallel and set to different resistance values. These variable resistors R1 to R4 are grounded at one end through respective analog switches SW11 to SW14, and connected at the other end to a non-inverting input of a same operational amplifier that constitutes the above-mentioned subtracter 54 of the tracking error detecting circuit 40. Turning on any one of the switches SW11 to SW14 changes the level of the outer or "B+C" reflected light reception signal to be applied to the non-inverting input of the operational amplifier, thereby resulting in a change of the offset amount.

In a storage circuit 64 of FIG. 11, there is stored ON/OFF information for the switches SW11 to SW14 that is intended to impart an optimum offset depending on various recording conditions such as the disk type and recording speed. In accordance with the current recording conditions, a control circuit 62 reads out the ON/OFF information on a selected one of the switches SW11 to SW14 so as to control the selected switch in a manner corresponding to the recording conditions. Such control by the control circuit 62 can form pits accurately on and along the track center line. Here, the sample and hold circuit 38 allows the tracking error signal to pass therethrough for an OFF period of the recording pulse signal or non-pit-forming period, but holds the tracking signal for an ON period of the recording pulse signal or pit-forming period. This control may be used in combination with the variable control of sampling and holding times based on the recording conditions as discussed earlier in relation to the first embodiment, and such combined control allows pits to be formed even more accurately on and along the track center line.

In the above-described embodiments, for the tracking-error-signal holding period, the current tracking error signal may be set to a zero level in stead of the preceding tracking error signal being held by the sample and hold circuit. Further, in such a case where the tracking control of the present invention is implemented via a digital servo mechanism, various digital offset values may be prestored in memory so that a suitable one of the stored values corresponding to the current recording conditions can be selectively read out and used in the tracking control.

Furthermore, whereas the embodiments have been described as recording information on a track formed as a groove of an optical disk ("groove recording"), the recording track may be a land of the optical disk ("land recording"). Moreover, the present invention is also applicable to cases where tracking error detecting schemes other than the push-pull method are employed. Finally, it should be obvious that the present invention can be applied to recording on various other optical disks than the CD-R media.

[THIRD EMBODIMENT]

Figure 12:
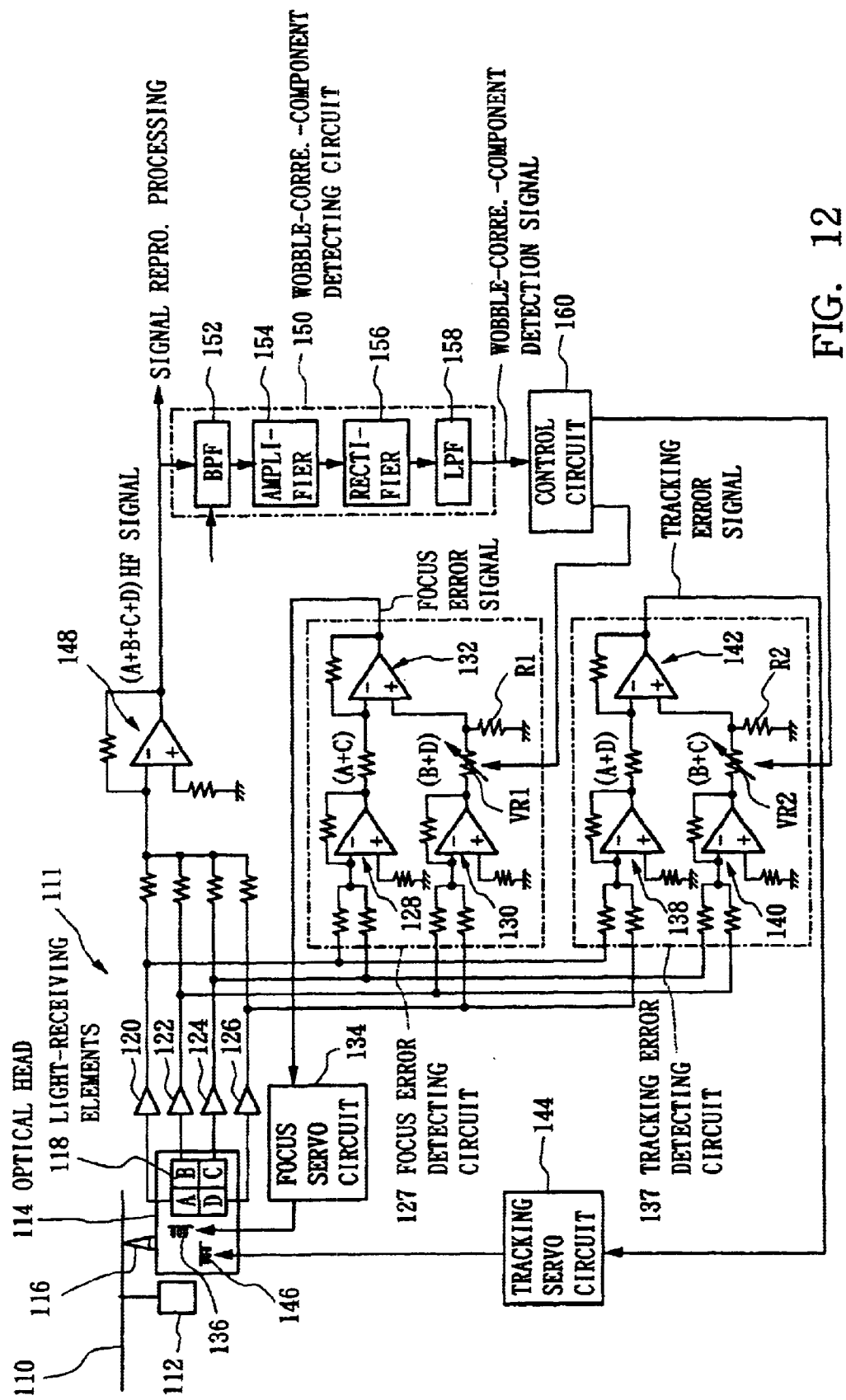
FIG. 12 is a block diagram showing en exemplary structure of an optical disk recording device in accordance with a third embodiment of the present invention.
Figure 13:
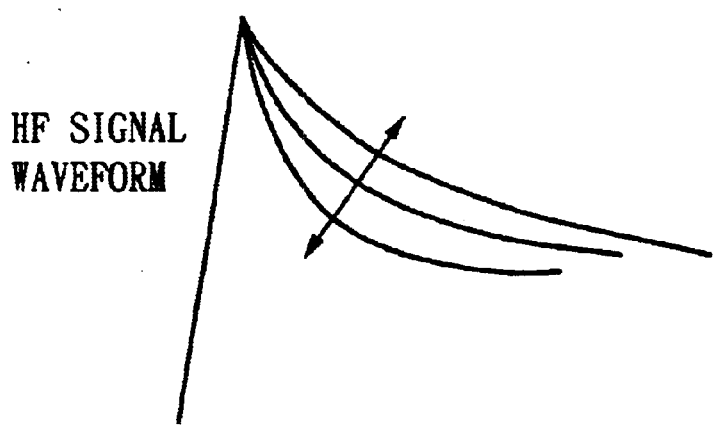
FIG. 13 is is a diagram explanatory of servo balance adjustment employed in conventional focus servo and tracking servo control.

FIG. 12 is a block diagram showing en exemplary structure of an optical disk recording drive, also capable of reproducing recorded information, in accordance with a third embodiment of the present invention. This optical disk drive 111 is characterized by automatized servo balance adjustment. In the recording surface of an optical disk 110, there are formed, as recording tracks, guide grooves (pre-grooves) that wind or wobble in predetermined cycles. In the case of the CD-R media, the frequency of the wobbles is set at 22.05 kHz for the normal (one-time) speed mode. The optical disk 110 is driven to rotate via a spindle motor 112, and specified information is recorded and reproduced using a laser light 116 irradiated from an optical head 114. Reflection of the irradiated laser light beam 116 from the optical disk 110 is received by a quadruple PIN photo diode 118 within the optical head 114 which forms four light-receiving elements. Reflected light reception signals A, B, C and D from the light-receiving elements are passed to corresponding current/voltage converting circuit 120, 122, 124 and 126, where each of the signals is converted to a signal having a voltage value corresponding to the signal's current value.

Summing amplifiers 128 and 130 add together the reflected light reception signals A, C and B, D, respectively. Subtracting amplifier 132 calculates a difference between the added results, i.e., (B+D)−(A+C), to thereby provide a focus error signal. Focus servo circuit 134 drives a focus actuator 136 within the optical head 114 on the basis of the focus error signal from the subtracting amplifier 132, to thereby perform focus control. In the described embodiment, focus servo balance adjustment is effected by adjusting a power-controlling (e.g., voltage-controlling) variable resistor VR1 in a voltage divider circuit. The voltage divider circuit, also including resistance R1, divides an output voltage of the summing amplifier 130 and passes the divided voltage to a non-inverting input of the subtracting amplifier 132.

Further, summing amplifiers 138 and 140 add together the reflected light reception signals A, D and B, C, respectively. Subtracting amplifier 142 calculates a difference between the added results, i.e., (B+C)−(A+D), to thereby provide a tracking error signal. Tracking servo circuit 144 drives a tracking actuator 146 within the optical head 114 on the basis of the tracking error signal from the subtracting amplifier 142, to thereby perform tracking control. In the described embodiment, tracking servo balance adjustment is effected by adjusting a power-controlling (e.g., voltage-controlling) variable resistor VR2 in another voltage divider circuit. This voltage divider circuit, also including resistance R2, divides an output voltage of the summing amplifier 140 and passes the divided voltage to a non-inverting input of the subtracting amplifier 142.

Summing amplifier 148 sums up all the reflected light reception signals (i.e., A+B+C+D) to thereby provide an HF (High Frequency) signal. The HF signal is delivered to a wobble-corresponding-component detecting circuit 150 as well as a signal reproduction processing system (not shown). The HF signal, having been delivered to the wobble-corresponding-component detecting circuit 150, is first applied to a band-pass filter 152 whose center frequency is set to equal the fundamental frequency of the wobble that is, for example, 22.05 kHz×n (n represents a recording speed magnification) for the CD-R media; the band-pass filter 152 thus extracts a wobble-corresponding component that corresponds to the frequency of the wobbles on the track. The extracted wobble-corresponding component is amplified by an amplifier 154, rectified by a rectifier 156, and smoothed by a low-pass filter 158, to provide a d.c. signal corresponding to the amplitude of the wobble-corresponding component (wobble-corresponding-component detection signal). Control circuit 160 controls the abovementioned variable resistors VR1 and VR2 on the basis of the wobble-corresponding-component detection signal, to thereby automatically adjust the focus servo balance and tracking servo balance into optimum conditions.

Figure 16A:
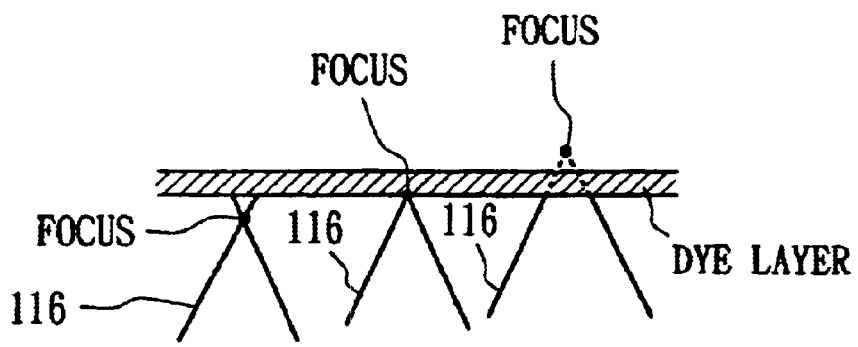
FIGS. 16A and 16B are diagrams explaining why characteristics of FIG. 15 can be obtained.
Figure 16B:
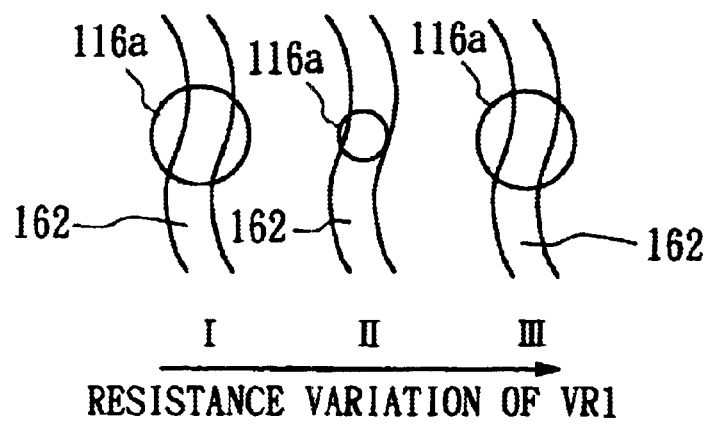
Figure 14:
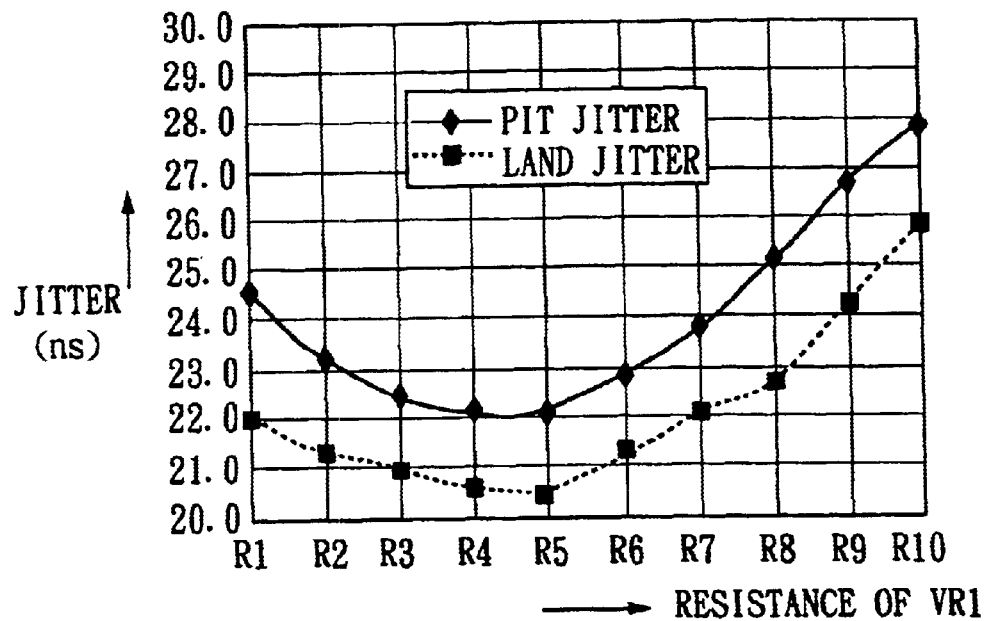
FIG. 14 is a graph showing jitter variations in a reproduced signal of information recorded while changing a resistance value of a focus-servo-balance adjusting variable resistor of FIG. 12.
Figure 15:
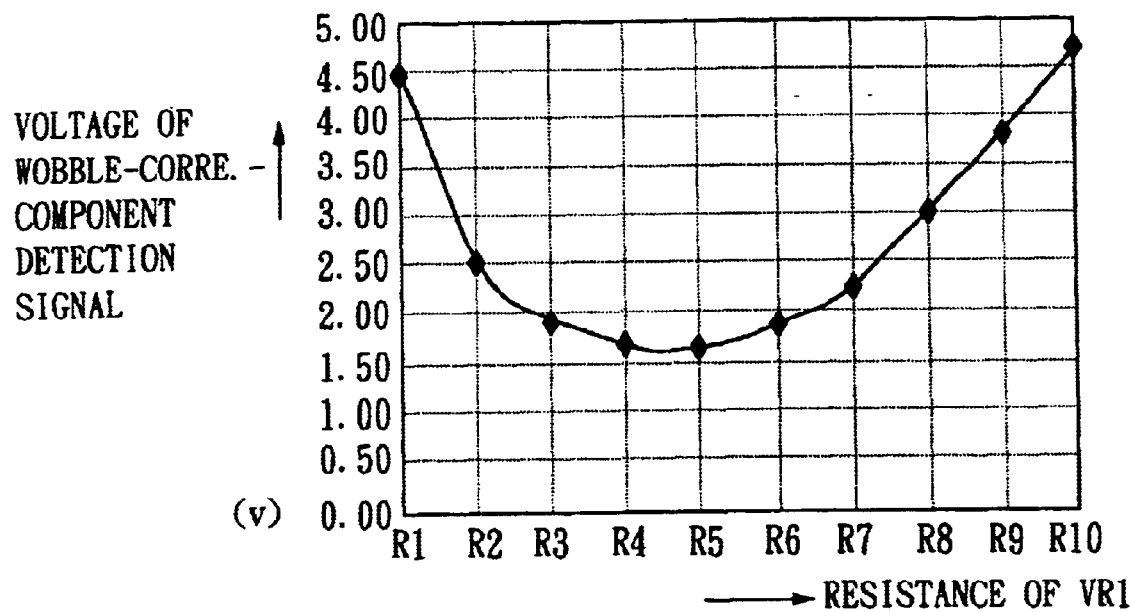
FIG. 15 is a graph showing variations in voltage characteristic of a wobble-corresponding-component detection signal when information is recorded while changing the resistance value of the focus-servo-balance adjusting variable resistor of FIG. 12.

In FIG. 14, there are shown jitter variations measured in reproduction of information that is recorded while changing the resistance of the focus-servo-balance adjusting variable resistor VR1. In this example, the point where the jitter is at its smallest level is where optimum focus servo balance appears to exist. Further, in FIG. 15, there are shown variations in voltage value of the wobble-corresponding-component detection signal when information is recorded while changing the resistance of the focus-servo-balance adjusting variable resistor VR1. From FIGS. 14 and 15, it is seen that the value of the variable resistor VR1 achieving the lowest jitter level is substantially equal to the value of the variable resistor VR1 achieving the lowest level of the wobble-corresponding component. This may be due to the fact that changing the focus depth of the laser light beam 116 by varying the focus servo balance as shown in FIG. 16A changes the size of a light beam spot 116a on a track (guide groove) 162 as shown in FIG. 16B and the track wobble has a smallest effect when the beam spot 116a falls precisely on the center of the track (i.e., when the focus servo balance is optimum).

Figure 17:
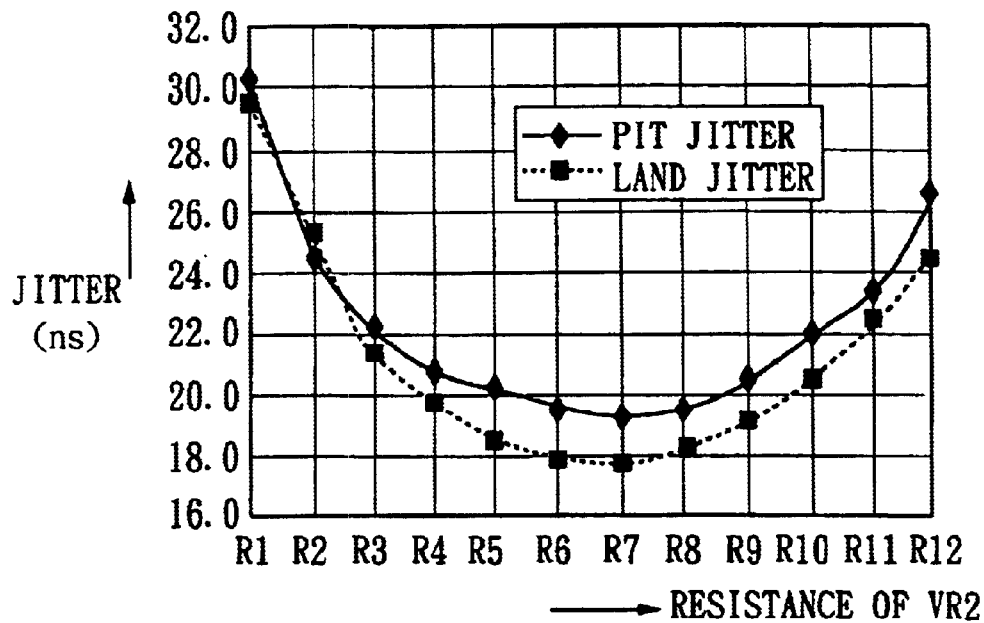
FIG. 17 is a graph showing jitter variations in a reproduced signal of information recorded while changing a resistance value of a tracking-servo-balance adjusting variable resistor of FIG. 12.
Figure 18:
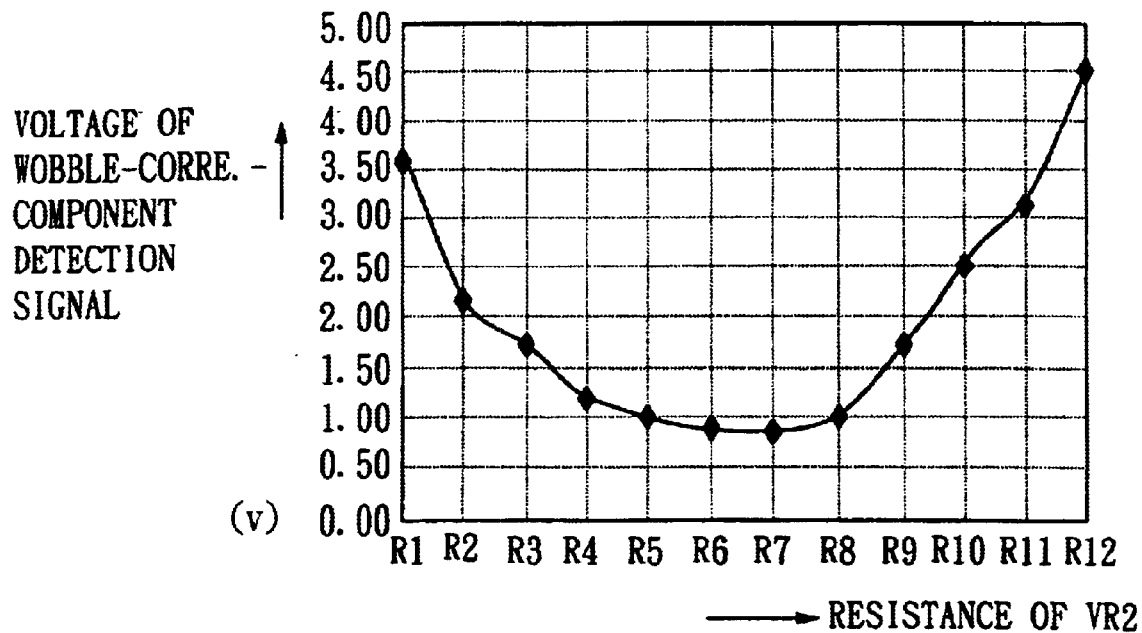
FIG. 18 is a graph showing variations in voltage characteristic of a wobble-corresponding-component detection signal when information is recorded while changing the resistance value of the tracking-servo-balance adjusting variable resistor of FIG. 12.
Figure 19A:
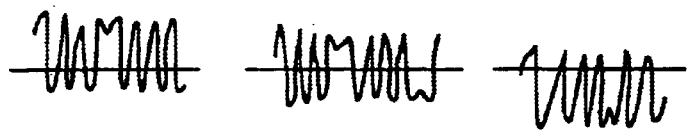
FIGS. 19A and 19B are diagrams explaining why characteristics of FIG. 18 can be obtained.
Figure 19B:
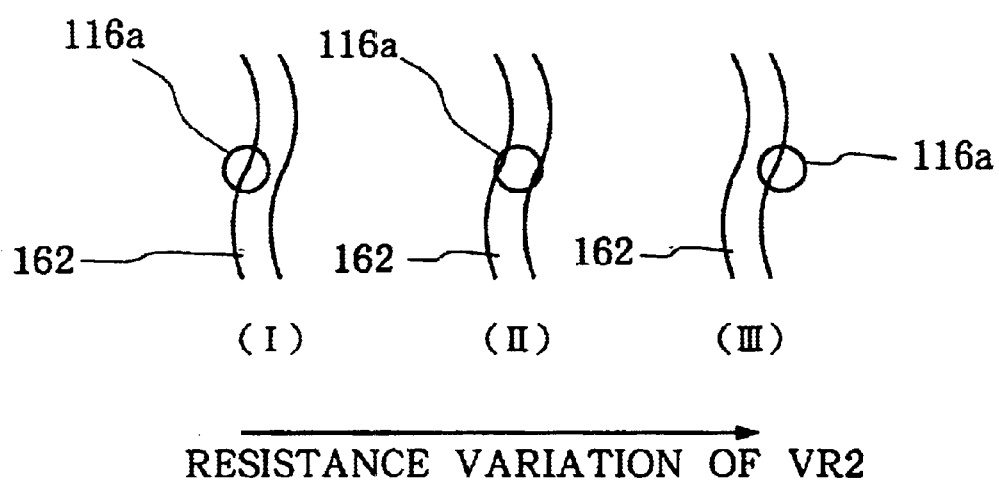

In FIG. 17, there are shown jitter variations measured in reproduction of information that is recorded while changing the resistance of the tracking-servo-balance adjusting variable resistor VR2. In this example, the point where the jitter is at its smallest level is where optimum tracking servo balance appears to exist. Further, in FIG. 18, there are shown variations in voltage value of the wobble-corresponding-component detection signal when information is recorded while changing the resistance of the tracking-servo-balance adjusting variable resistor VR2. From FIGS. 17 and 18, it is seen that the value of the variable resistor VR2 achieving the lowest jitter level is substantially equal to the value of the variable resistor VR2 achieving the lowest level of the wobble-corresponding component. This may be due to the fact that changing the focus depth of the laser light beam 116 by varying the tracking servo balance as shown in FIG. 19A changes the size of the light beam spot 116a on the track (guide groove) 162 as shown in FIG. 19B and the track wobble has a smallest effect when the beam spot 116a falls precisely on the center of the track (i.e., when the tracking servo balance is optimum).

Because of the foregoing reasons, the control circuit 160 of FIG. 12 is arranged to adjust the two variable resistors VR1 and VR2 in such a manner that the wobble-corresponding-component detection signal presents its lowest level during recording. The adjustment by the control circuit 160 may be realized, for example, by prestoring such values of the variable resistors VR1 and VR2 that may achieve the lowest level of the wobble-corresponding-component detection signal, through trial recording where information is recorded on a power calibration area (PCA) of the disk located inward of the disk's lead-in area while varying the values of the variable resistors YR1 and YR2, and then carrying out actual recording with the variable resistors VR1 and VR2 fixed to the prestored values. Alternatively, the values of the variable resistors VR1 and VR2 may be adjusted in real time by constantly changing them in such a way that the level of the wobble-corresponding-component detection signal is lowered. With this real-time adjustment, it is possible to properly address a difference in optimum servo balance conditions due to different film thicknesses of the dye layer between the inner and outer portions of the optical disk.

It will be appreciated that the positions of the variable resistor VR1 and resistance R1 may be reversed. Likewise, the positions of the other variable resistor VR2 and resistance R2 may be reversed.

[FOURTH EMBODIMENT]

Figure 20A:
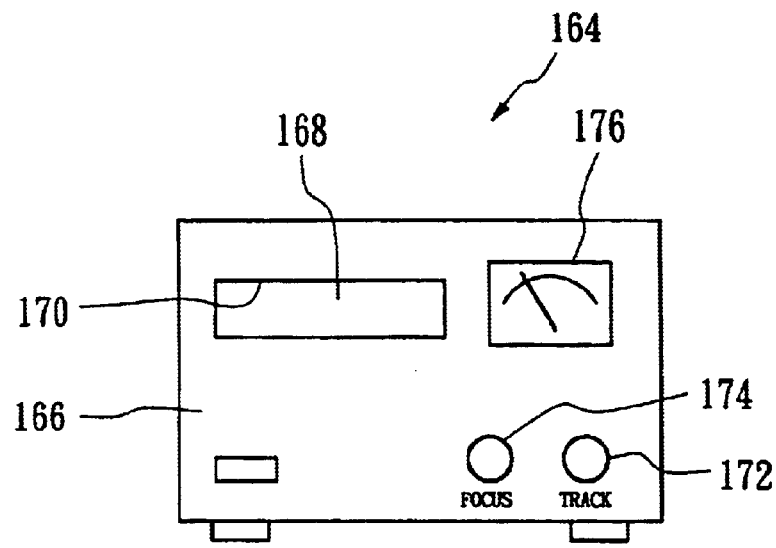
Figure 20B:
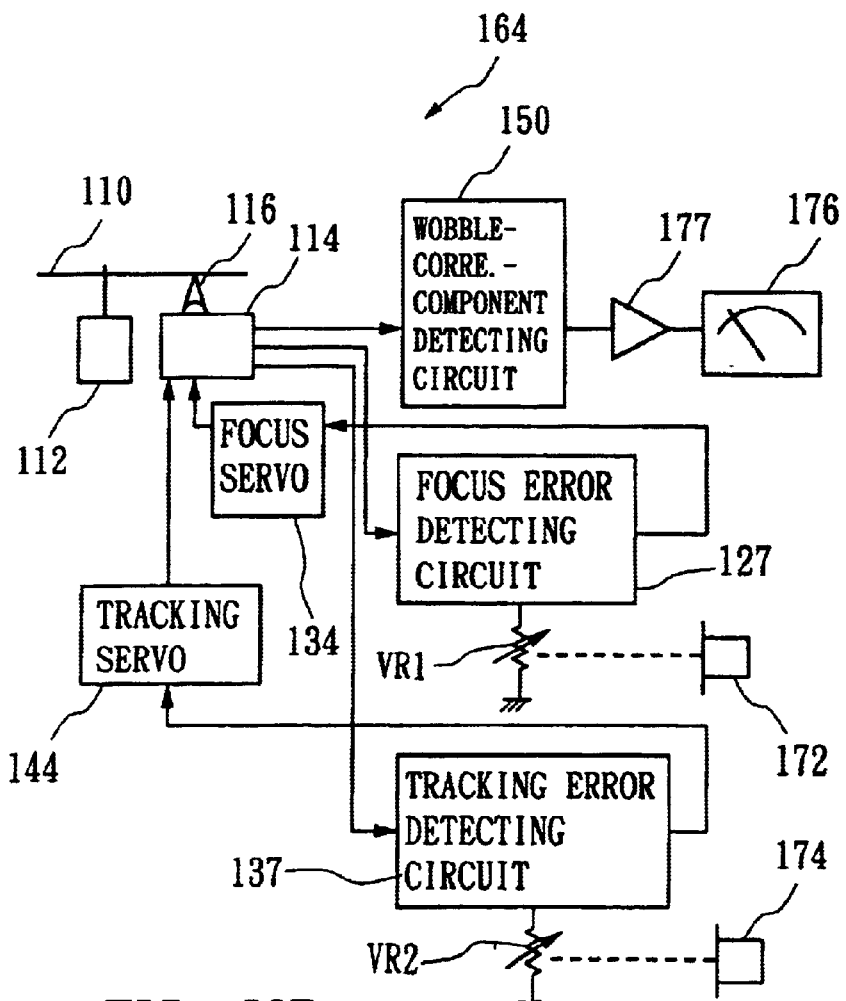

Referring now to FIGS. 20A and 20B, there is shown another embodiment of the optical disk drive which is arranged to permit servo balance adjustment through user's manual operation. More specifically, FIG. 20A shows a front panel 166 of the optical disk drive 164, on which are provided a doorway 170 to a disk tray 168, a focus-servo-balance adjusting knob 172, a tracking-servo-balance adjusting knob 174 and a wobble-corresponding-component level meter 176.

FIG. 20B is a block diagram showing an exemplary internal organization of the optical disk drive 164, where same elements as those of FIG. 12 are denoted by same reference characters as in the figure. Variable resistor VR1 in a focus error detecting circuit 127 is a manual variable resistor whose resistance value is adjustable by the user via the focus-servo-balance adjusting knob 172. Similarly, a variable resistor VR2 in a tracking error detecting circuit 137 is a manual variable resistor whose resistance value is adjustable by the user via the tracking-servo-balance adjusting knob 174. In FIG. 20B, the positions of the variable resistor VR1 and resistance R1 are reversed from those in FIG. 12, and so are the positions of the variable resistor VR2 and resistance R2.

Wobble-corresponding-component detection signal (i.e., a d.c. signal varying in level in accordance with the amplitude of a wobble-corresponding component contained in the HF signal) output from the wobble-corresponding-component detecting circuit 150 is passed through a driver 177 to the level meter 176, where the signal level is visually displayed. To effect the servo balance adjustment, the optical disk 10 is set in place, and the optical disk drive 164 is placed in a recording mode or trial recording mode. Then, the user turns the focus-servo-balance adjusting knob 172 and tracking-servo-balance adjusting knob 174 while viewing the level meter 176 and stops turning the knobs 172 and 174 at positions where the level meter 176 presents a minimum level of the wobble-corresponding-component detection signal: specifically, one of the knobs 172 or 174 is first turned to find the minimum level and then the other knob 174 or 172 is turned to find the minimum level.

[FIFTH EMBODIMENT]

Figure 21A:
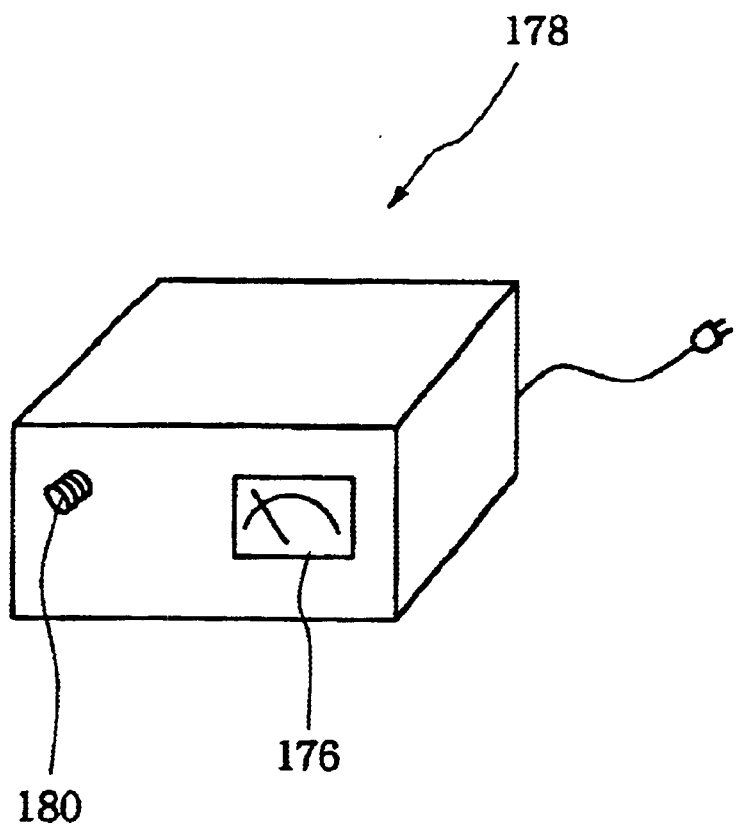
Figure 21B:
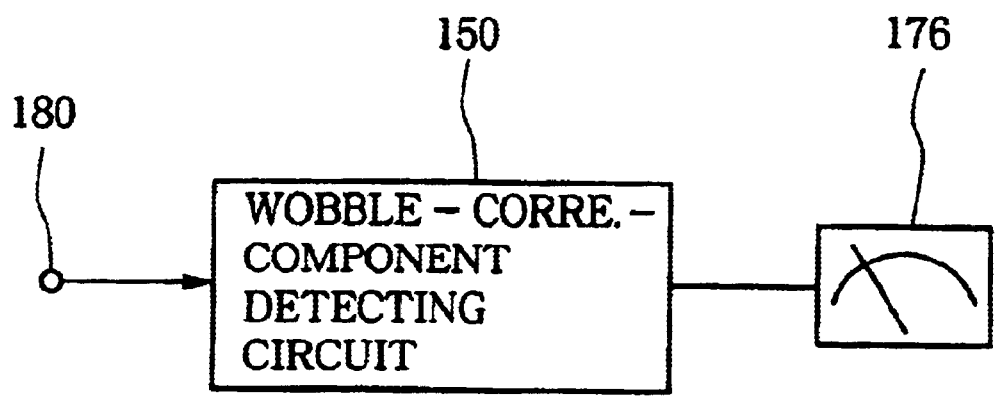

FIGS. 21A and 21B show a servo balance detecting device for use with an optical disk drive, which embodies a fifth embodiment of the present invention. More specifically, FIG. 21A is an external view of the servo balance detecting device while FIG. 21B is a block diagram showing an internal structure of the device, where same elements as those in FIG. 20 are denoted by same reference characters as in the figure. The servo balance detecting device 78 includes an HF signal input 180 for receiving the HF signal from the optical disk drive, and the level meter 176 as described above in relation to FIG. 20. The HF signal received via the signal input 180 is first delivered to the wobble-corresponding component detecting circuit 150 for detection of a wobble-corresponding component, and a level of the detected wobble-corresponding component is visually shown on the level meter 176. To effect the servo balance adjustment, the optical disk is set in place within the optical disk drive, and the optical disk drive is placed in a recording mode or trial recording mode. Then, the user turns the focus-servo-balance adjusting knob that is set to a half-fixed resistance value, and stops turning the knob at a particular position where the level meter 176 presents a minimum level of the wobble-corresponding-component detection signal.

What is claimed is:

1. An optical disk recording device, comprising:
    an optical head that irradiates recording laser light beam onto an optical disk for recording of information thereon and receives a reflection of the laser light beam from the optical disk to provide reflected light reception signals;
    a wobble component detecting section that detects a wobble component, corresponding to a wobble of a track on the optical disk, contained in the reflected light reception signals during the recording of the optical disk;
    a servo error detecting section at detects a servo error by performing arithmetic operations between the reflected light reception signals;

a servo section that corrects the servo error by driving a servo actuator based on the servo error detected by said servo error detecting section;

an adjusting section that adjusts level balance between the reflected light reception signals to be used in the arithmetic operations performed by said servo error detecting section;

a control section that automatically adjusts the level balance between the reflected light reception signals by controlling said adjusting section in such a way that the wobble component detected by said wobble component detecting section presents a minimum level; and a plurality of variable resistor, wherein the optical disk includes a power calibration area (PCA), and said servo error detecting section, servo section, adjusting section, and control section are configured to allow balance adjustment by using resistance values for said resistors that are obtained through trial recordings and pre-stored on said PCA of said optical disk.

* * * * *